(12) United States Patent
Wang

(10) Patent No.: US 10,953,857 B2
(45) Date of Patent: Mar. 23, 2021

(54) INFLATION ADAPTER

(71) Applicant: Wei-Chi Wang, Tainan (TW)

(72) Inventor: Wei-Chi Wang, Tainan (TW)

( * ) Notice: Subject to any disclaimer, the term of this patent is extended or adjusted under 35 U.S.C. 154(b) by 0 days.

(21) Appl. No.: 16/546,767

(22) Filed: Aug. 21, 2019

(65) Prior Publication Data

US 2021/0053535 A1 Feb. 25, 2021

(51) Int. Cl.
*F16K 15/20* (2006.01)
*B60C 29/04* (2006.01)
*B60S 5/04* (2006.01)

(52) U.S. Cl.
CPC ..................................... *B60S 5/043* (2013.01)

(58) Field of Classification Search
CPC ....... B60S 5/043; B60C 29/04; B60C 29/064; B60C 29/068; F16K 15/20; F16K 15/205; F16L 37/138
USPC ........................................................ 137/231
See application file for complete search history.

(56) References Cited

U.S. PATENT DOCUMENTS

2018/0172167 A1* 6/2018 Kuo .................... F16K 15/20

* cited by examiner

*Primary Examiner* — Paul J Gray
(74) *Attorney, Agent, or Firm* — Birch, Stewart, Kolasch & Birch, LLP

(57) ABSTRACT

An inflation adapter is used for connecting with an inflator unit and assembled to a tire valve, and the inflation adapter has a nozzle body and a sleeve sleeved on the nozzle body. The nozzle body has a ventilation channel, a sealing washer, and at least one locking part. The ventilation channel is formed axially through the nozzle body. The sealing washer is mounted in the bottom end of the ventilation channel. The at least one locking part is radially movable on the nozzle body. A user pushes the sleeve to abut against the at least one locking part to assemble the inflation adapter with the tire valve. The quickly assembling/dissembling inflation adapter saves the operation time and improves the operation convenience for driving safety.

2 Claims, 18 Drawing Sheets

1

INFLATION ADAPTER

BACKGROUND OF THE INVENTION

1. Field of the Invention

The present invention relates to an inflation adapter, and more particularly to an inflation adapter that is connected to an inflator unit and assembled to a tire valve.

2. Description of Related Art

Generally, when inflating a tire, an inflator unit is connected to a tire valve via an inflation adapter and is activated to inject air into the tire.

With reference to FIG. 18, a conventional inflation adapter comprises a seat 90, an airtight gasket 91, and a connecting tube 92. The seat 90 connects with the inflator unit. The airtight gasket 91 is mounted in the seat 90. The connecting tube 92 is disposed rotatably at an end of the seat 90 and has an internal thread 93. When inflating the tire, a user connects a tire valve 80 with the seat 90 and turns the connecting tube 92 to allow the internal thread 93 in the connecting tube 92 to engage with an external thread 81 on the tire valve 80. Thus, the tire valve 80 can hermetically abut against the airtight gasket 91, and then the user can activate the inflator unit to inflate the tire.

However, when connecting the conventional inflation adapter and the tire valve 80 through engaging the internal thread 93 in the connecting tube 92 with the external thread 81 on the tire valve 80, the user has to turn the connecting tube 92 until the conventional inflation adapter hermetically connects with the tire valve 80, which is inconvenient and highly time-consuming.

Also, since the conventional inflation adapter is hermetically connected with the tire valve 80 by turning the connecting tube 92 to allow the airtight gasket 91 to abut against the tire valve 80, when the user is disassembling or locking the conventional inflation adapter and the tire valve 80, the seat 90 of the conventional inflation adapter keeps pressing a valve core 82 of the tire valve 80 such that gas inside the tire is discharged continuously. Therefore, when the user inflates the tire to a standard pressure, the gas inside the tire will leak during disassembling the conventional inflation adapter. Furthermore, as it takes a long time to disassemble and lock the conventional inflation adapter, air pressure inside the tire may be lower than the standard pressure value after the user removes the conventional inflation adapter. The tire with the air pressure that is lower than the standard pressure may cause driving hazards.

To overcome the shortcomings, the present invention provides an inflation adapter to obviate the aforementioned problems.

SUMMARY OF THE INVENTION

The main objective of the invention is to provide an inflation adapter that solves the problem that the inflation adapter takes a long time to disassemble and lock such that the air pressure inside the tire may be lower than the standard pressure value, which may cause the driving hazards.

The inflation adapter is used for connecting with an inflator unit and is assembled to a tire valve. The inflation adapter comprises a nozzle body and a sleeve. The nozzle body has a ventilation channel, a sealing washer, and at least one locking part. The ventilation channel is formed axially through the nozzle body. The sealing washer is mounted in the bottom end of the ventilation channel. The at least one locking part is radially movable on the nozzle body.

The sleeve is sleeved on the nozzle body, is axially slidable on the nozzle body, and selectively pushes against the at least one locking part to securely hold the tire valve.

Therefore, the inflation adapter in accordance with the present invention has the following advantages.

1. Assemble or disassemble the inflation adapter quickly: when a user assembles the inflation adapter with the tire valve, the user directly holds and pushes the sleeve downward to abut against the at least one locking part to buckle and fix the tire valve 30. Thereby, the user can quickly assemble or disassemble the inflation adapter to save the operation time and improve the operation convenience.

2. Avoid gas leakage inside the tire during assembly and disassembly: because the user can quickly assemble or disassemble the inflation adapter, the user can quickly disassemble the inflation adapter when the air pressure inside the tire is the standard air pressure. Thereby, the air pressure in the tire can effectively avoid leakage and maintain the standard air pressure to improve driving safety.

Other objects, advantages and novel features of the invention will become more apparent from the following detailed description when taken in conjunction with the accompanying drawings.

DETAILED DESCRIPTION OF PREFERRED EMBODIMENT

Figure 1:
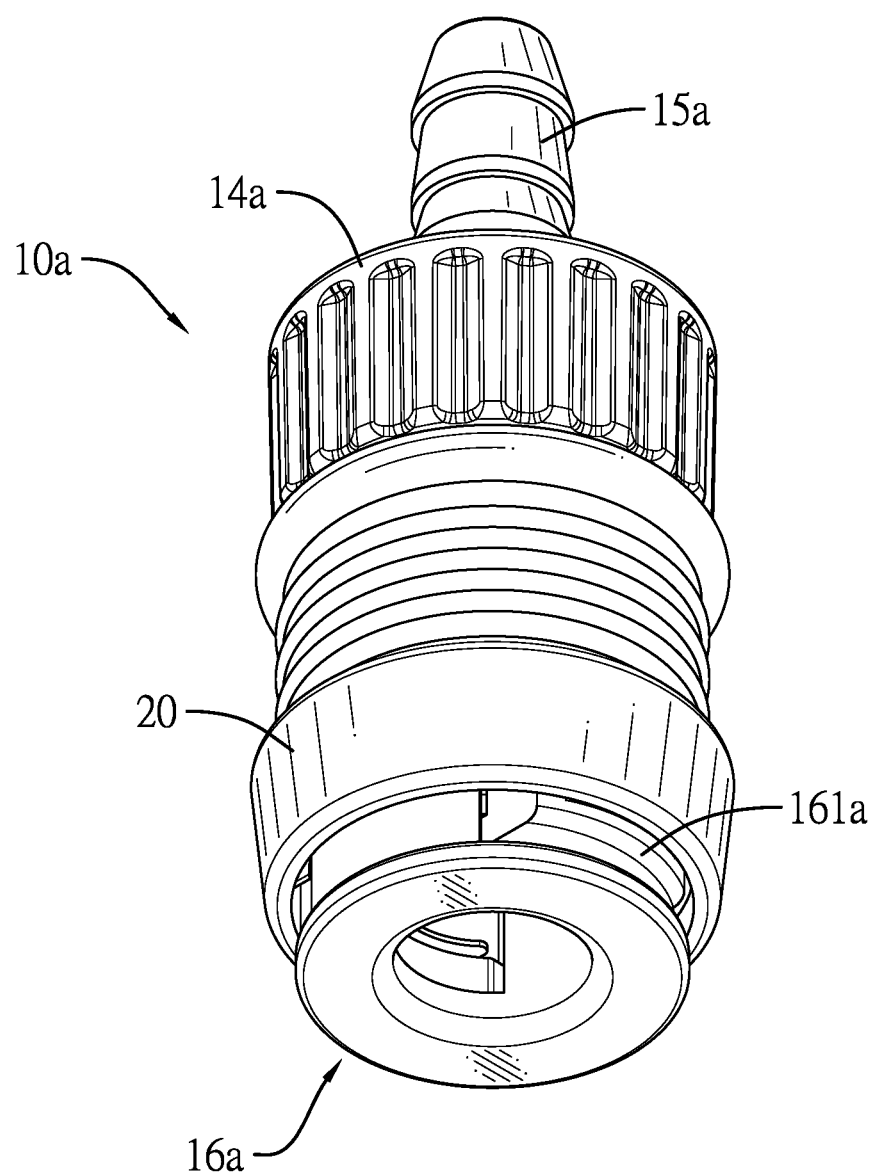
FIG. 1 is a perspective view of a first embodiment of an inflation adapter in accordance with the present invention.

With reference to FIGS. 1 to 10, an inflation adapter in accordance with the present invention has several preferred embodiments. The inflation adapter is used for connecting with an inflator unit and assembled to a tire valve 30. The inflation adapter comprises a nozzle body 10a, 10b, 10c and a sleeve 20.

The nozzle body 10a, 10b, 10c has a ventilation channel 11, a sealing washer 12, and at least one locking part 13a, 13b, 13c. The ventilation channel 11 is formed axially through the nozzle body 10a, 10b, 10c. The sealing washer 12 is mounted in a bottom end of the ventilation channel 11. The at least one locking part 13a, 13b, 13c is radially movable on the nozzle body 10a, 10b, 10c. The sealing washer 12 has a flange 121 which is located at the bottom end of the sealing washer 12 and protrudes downward from the bottom end of the sealing washer 12. Besides, an inner side of the at least one locking part 13a, 13b, 13c is serrated or threaded. Specifically, the at least one locking part 13a, 13b, 13c may include two locking parts 13a, 13b, 13c.

The sleeve 20 is sleeved on the nozzle body 10a, 10b, 10c, is axially slidable on the nozzle body 10a, 10b, 10c, and selectively pushes against the two locking parts 13a, 13b, 13c to securely hold the tire valve 30.

Figure 3:
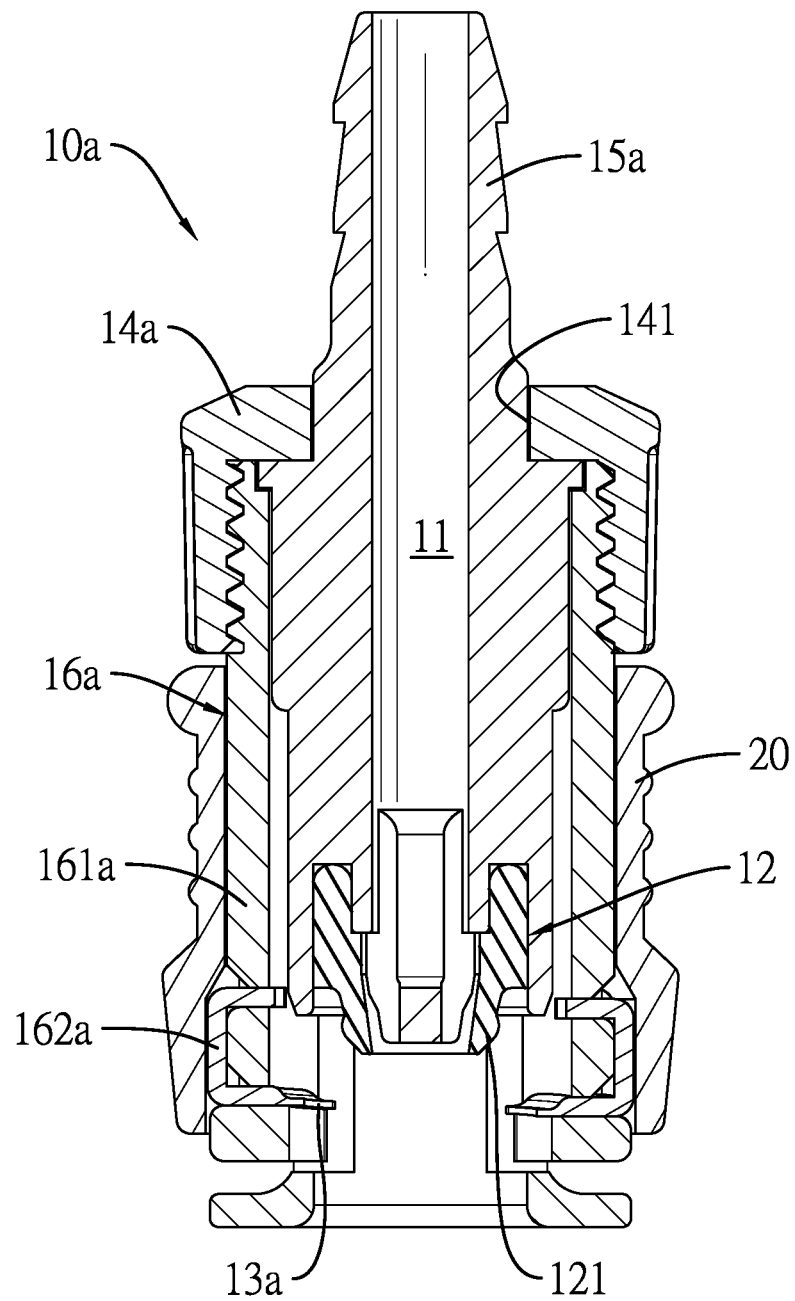
FIG. 3 is a cross-sectional side view of the inflation adapter in FIG. 1.
Figure 5:
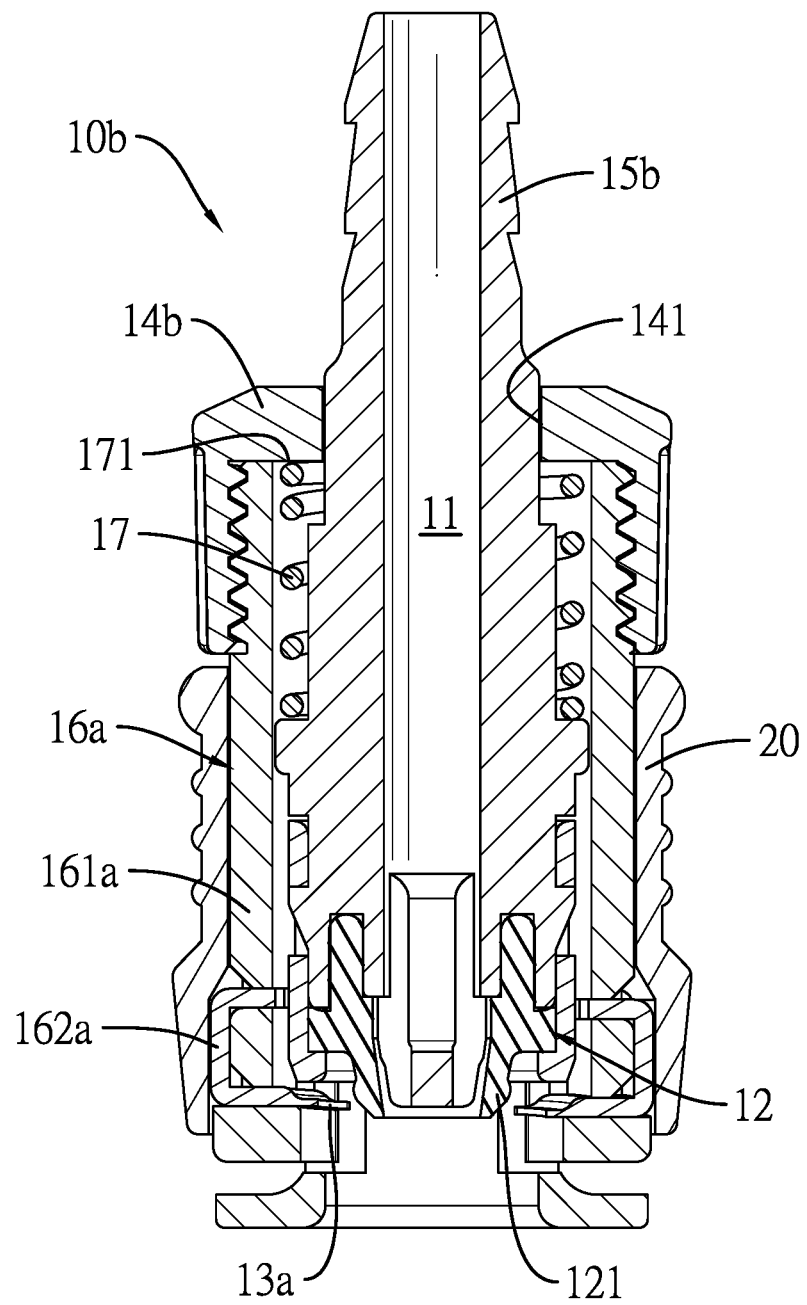
FIG. 5 is a cross-sectional side view along line 5-5 in FIG. 4.
Figure 6:
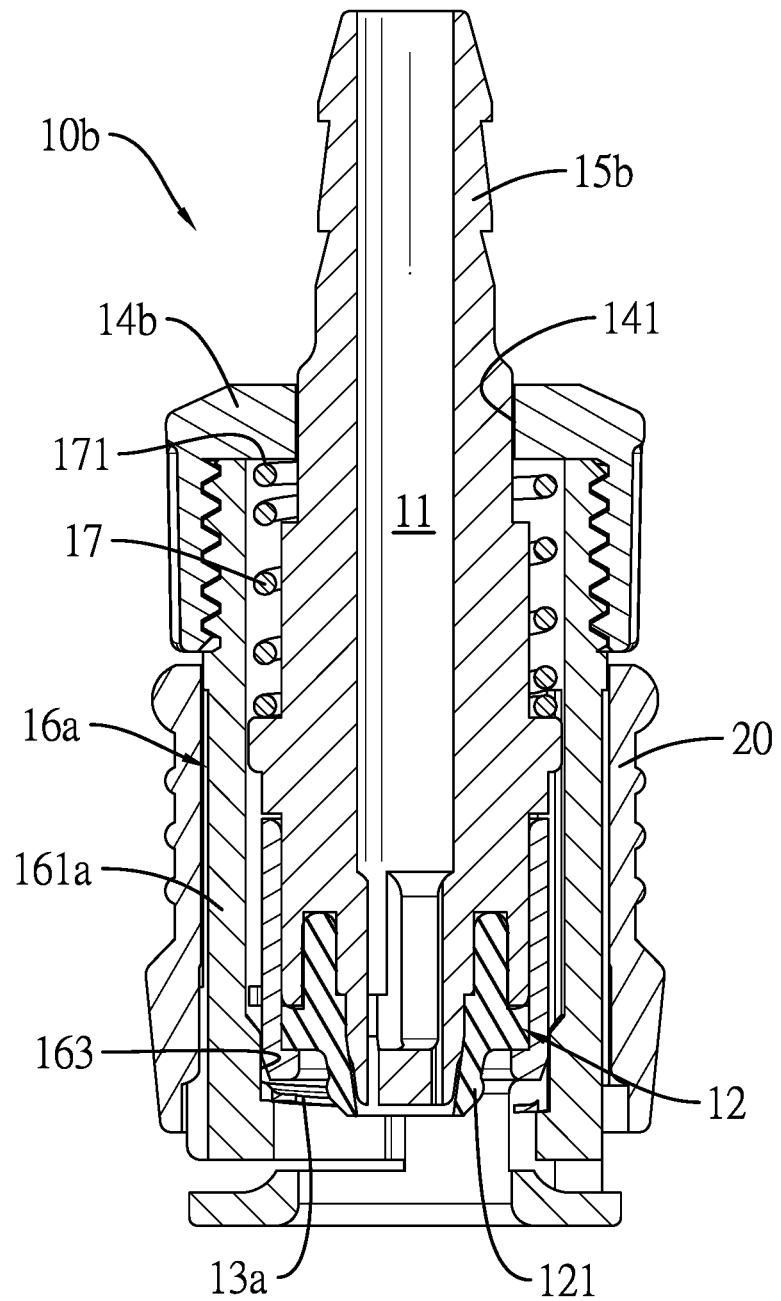
FIG. 6 is a cross-sectional side view along line 6-6 in FIG. 4.
Figure 7:
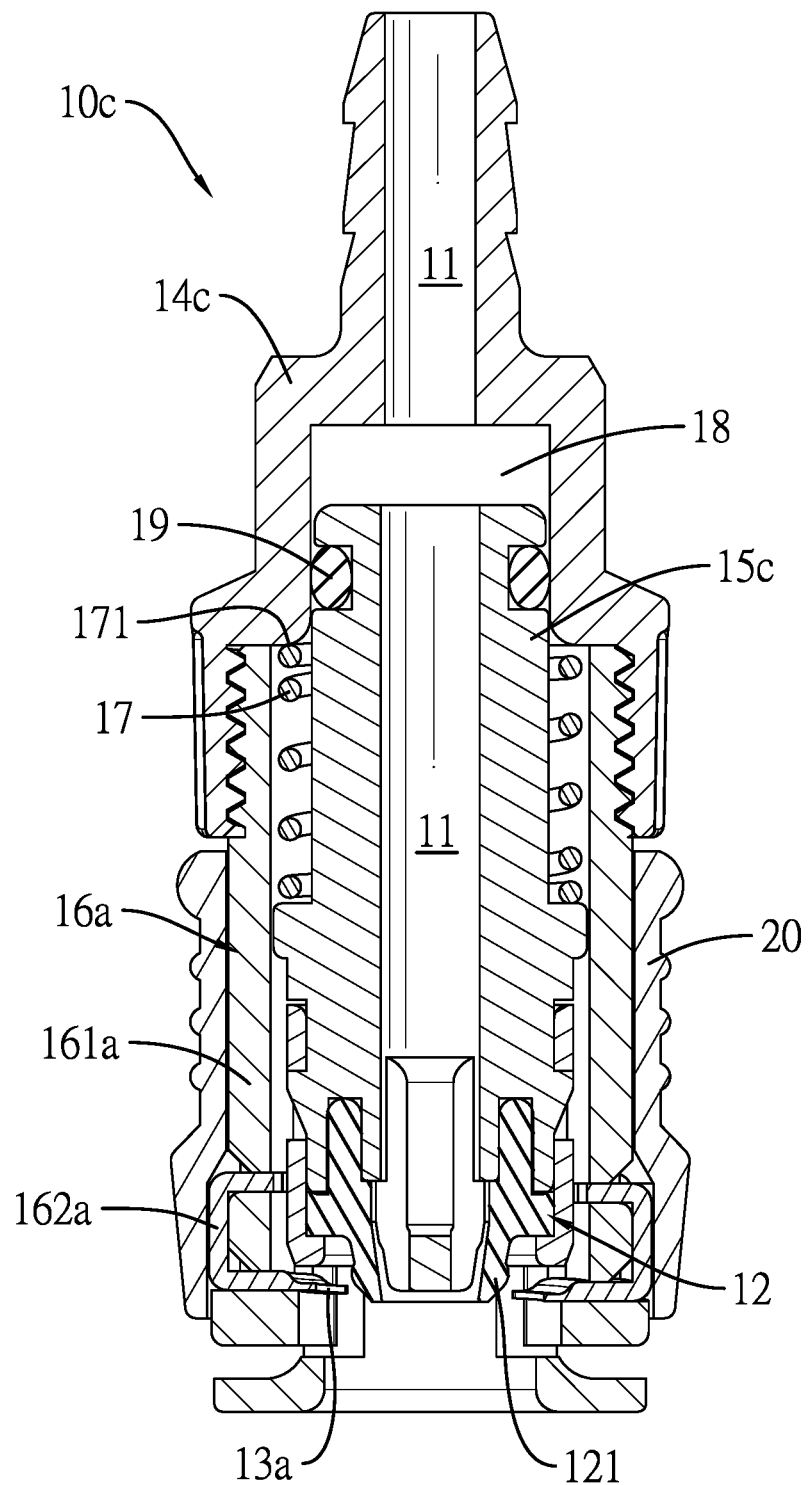
FIG. 7 is a cross-sectional side view of a third embodiment of an inflation adapter in accordance with the present invention.

With reference to FIGS. 3, 5, and 7, the inflation adapter of the present invention can present different embodiments for the detailed modifications of the structure of the nozzle body 10a, 10b, 10c. The embodiments of the nozzle body 10a, 10b, 10c will be described in detail as follows.

Figure 2:
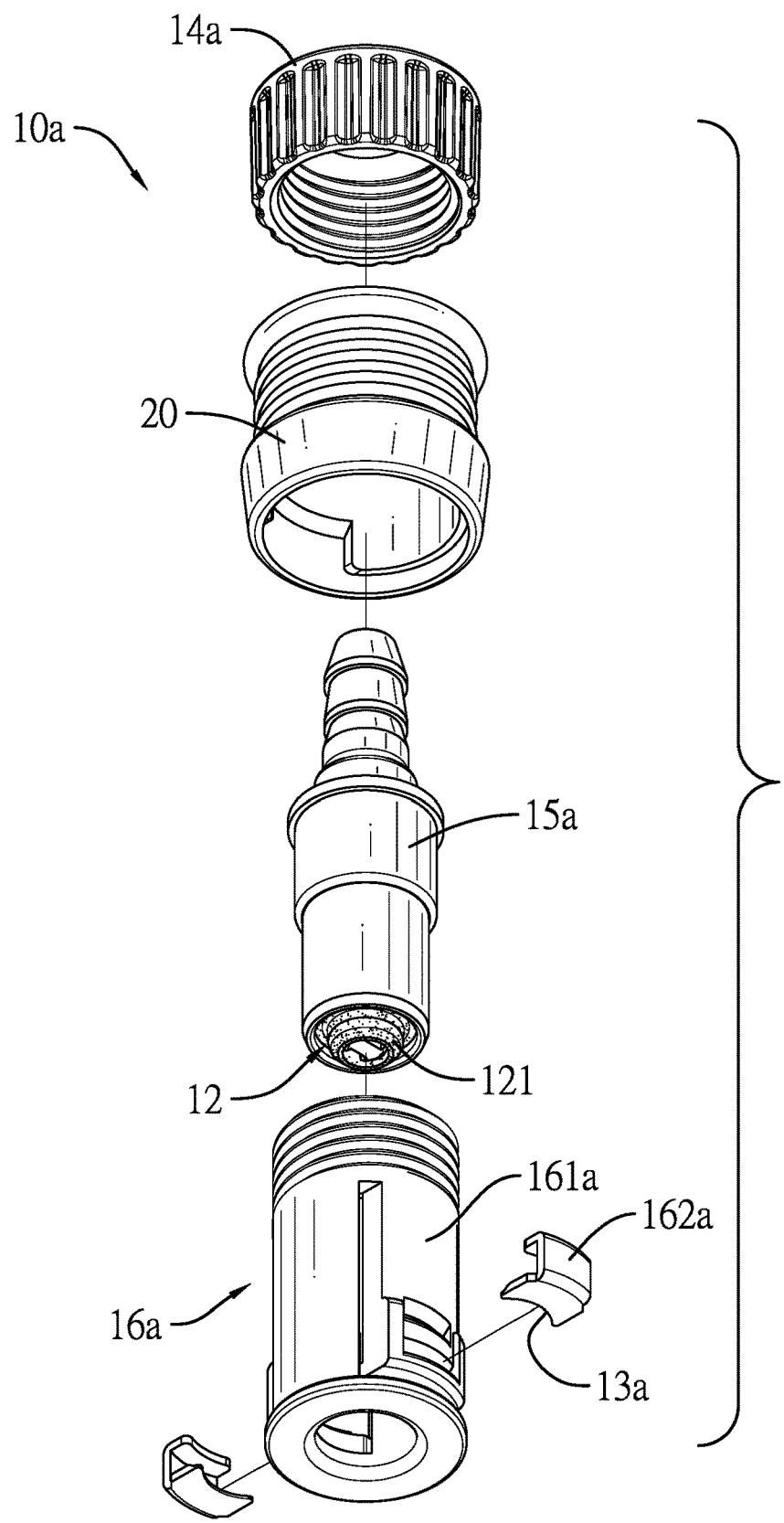
FIG. 2 is an exploded perspective view of the inflation adapter in FIG. 1.

With reference to FIGS. 2 and 3, in a first preferred embodiment of the inflation adapter, the nozzle body 10a has a mounting base 14a, a connecting component 15a, and a holding member 16a. The mounting base 14a has a hole 141. The connecting component 15a is slidably mounted through the hole 141 of the mounting base 14a and the ventilation channel 11 axially extends through the connecting component 15a, such that the sealing washer 12 is mounted to a bottom end of the connecting component 15a. The holding member 16a is mounted to the mounting base 14a and abuts the connecting component 15a, the two locking parts 13a are located on the holding member 16a and below the connecting component 15a, and the sleeve 20 is sleeved on the holding member 16a and is axially slidable on the holding member 16a.

Figure 4:
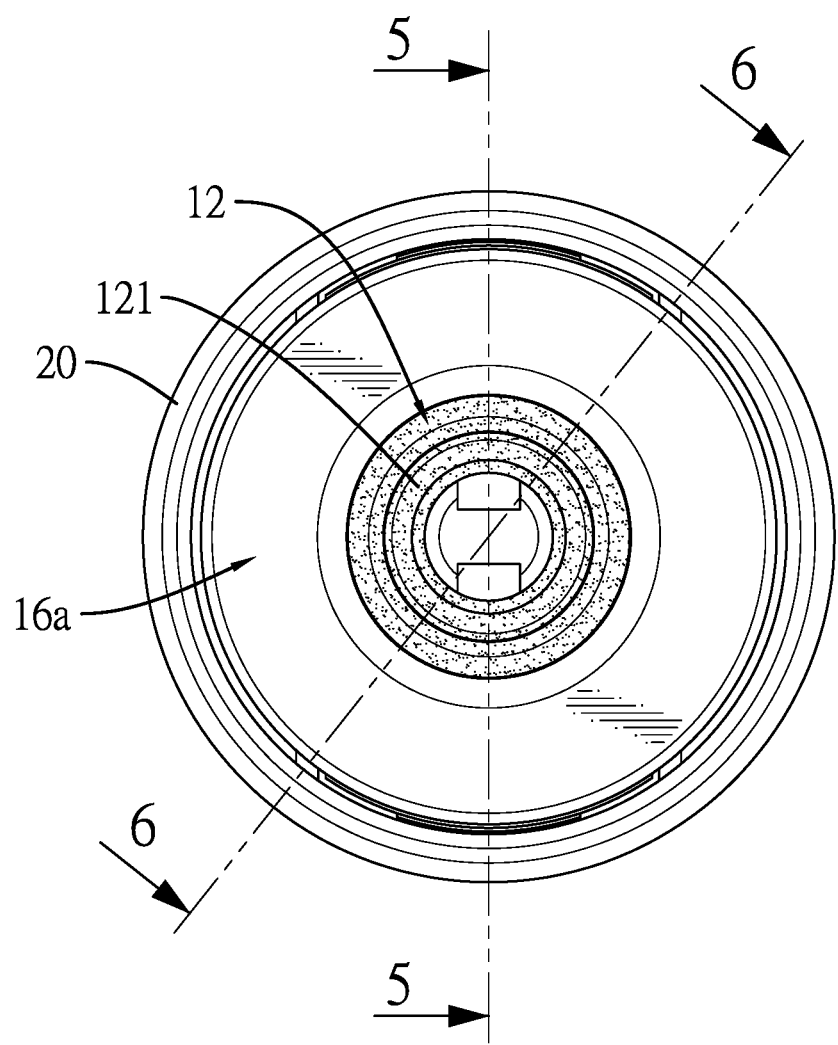
FIG. 4 is a bottom view of a second embodiment of an inflation adapter in accordance with the present invention.

With reference to FIGS. 4 and 5, in a second preferred embodiment of the inflation adapter, the nozzle body 10b has a mounting base 14b, a connecting component 15b, a restoring spring 17, and a holding member 16a. The mounting base 14b has a hole 141. The connecting component 15b is mounted through the hole 141 of the mounting base 14b, which is axially slidable relative to the mounting base 14b, and the ventilation channel 11 axially extends through the connecting component 15b, such that the sealing washer 12 is mounted to a bottom end of the connecting component 15b. The restoring spring 17 is mounted between the connecting component 15b and the mounting base 14b and the restoring spring 17 has two opposite ends 171 abutting the connecting component 15b and the mounting base 14b, respectively. The holding member 16a is mounted to the mounting base 14b and abuts the connecting component 15b, the two locking parts 13a are located on the holding member 16a and below the connecting component 15b, and the sleeve 20 is sleeved on the holding member 16b and is axially slidable on the holding member 16a.

With reference to FIG. 7, in a third preferred embodiment of the inflation adapter, the nozzle body 10c has a mounting base 14c, a connecting component 15c, a restoring spring 17, a sliding space 18, a hermetic washer 19, and a holding member 16a. The connecting component 15c is mounted on the mounting base 14c, and is axially slidable relative to the mounting base 14c. The ventilation channel is defined through the mounting base 14c and the connecting component 15c. The sliding space 18 is defined between the mounting base 14c and the connecting component 15c and communicates with the ventilation channel 11. The sealing washer 12 is mounted to a bottom end of the connecting component 15c. The restoring spring 17 is mounted between the connecting component 15c and the mounting base 14c and the restoring spring 17 has two opposite ends 171 abutting the connecting component 15c and the mounting base 14c, respectively. The hermetic washer 19 is mounted between the connecting component 15c and the mounting base 14c to seal the sliding space 18. The holding member 16a is mounted on the mounting base 14c, the two locking parts 13a are located on the holding member 16a and below the connecting component 15c, and the sleeve 20 is sleeved on the holding member 16a and is axially slidable on the holding member 16a.

Figure 8:
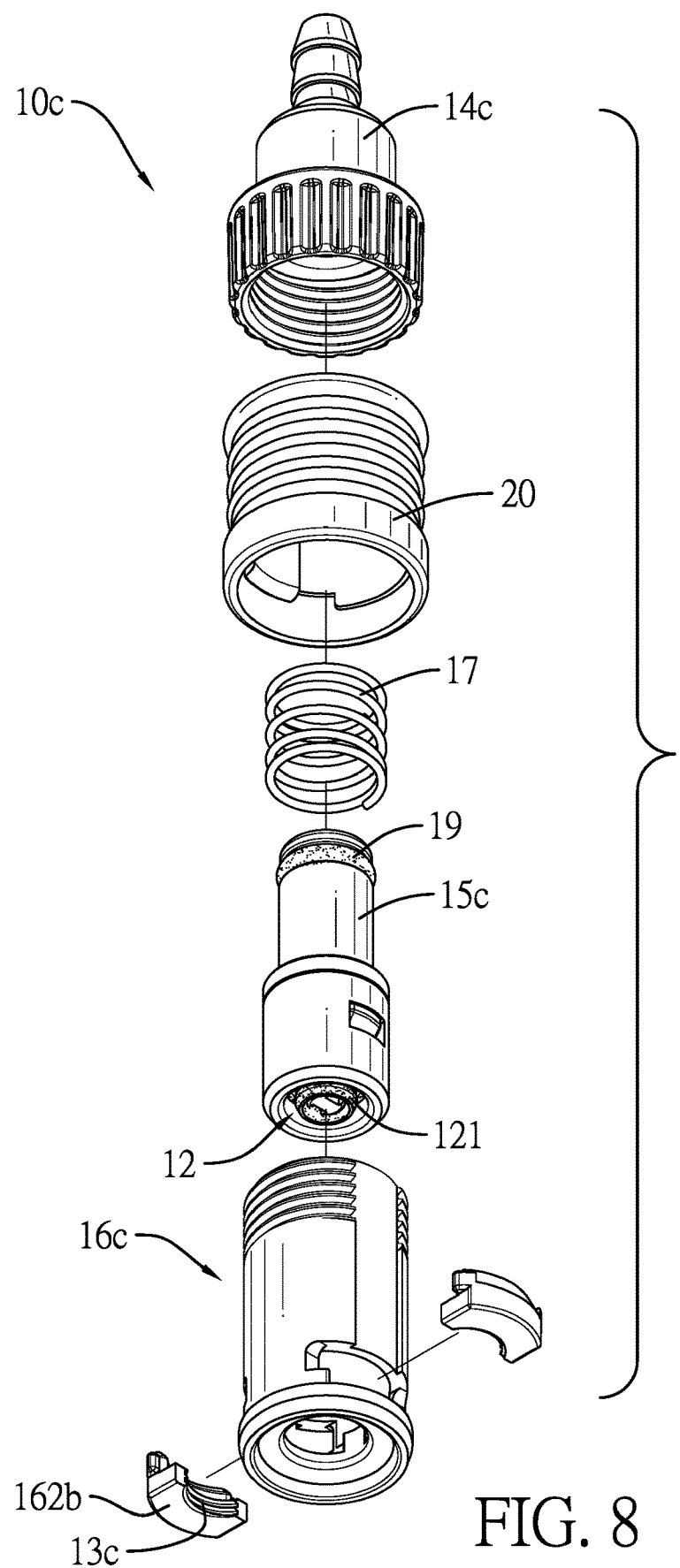
FIG. 8 is an exploded perspective view of a fourth embodiment of an inflation adapter in accordance with the present invention.
Figure 9:
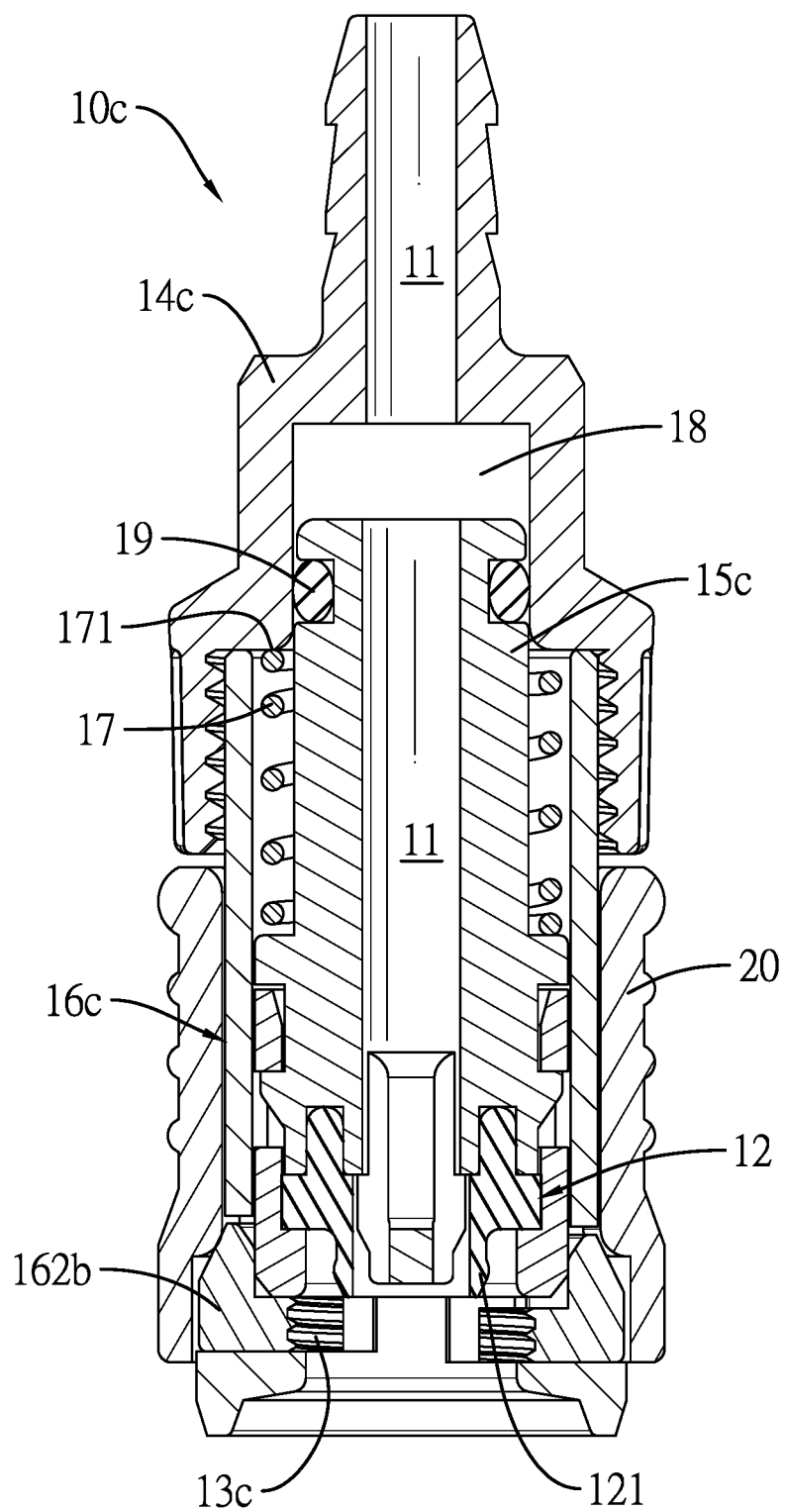
FIG. 9 is a cross-sectional side view of the inflation adapter in FIG. 8.

With reference to FIGS. 2, 8, and 9, the inflation adapter in accordance with the present invention makes modifications to the structure of the holding member 16a, 16b to present different embodiments. The embodiments of the holding member 16a, 16b will be described further below.

With reference to FIGS. 2 to 7, in the first preferred embodiment to the third preferred embodiment of the inflation adapter, the holding member 16a has at least one elastic piece 161 and at least one pushing protrusion 162. Specifically, the at least one elastic piece 161 may include two elastic pieces 161. The two elastic pieces 161 are connected with the mounting base 14a, 14b, 14c. Each of the at least one locking part 13a is disposed on an inner side of a respective one of the at least one elastic piece 161. Specifically, the at least one pushing protrusion 162 may include two pushing protrusions 162. The two pushing protrusions 162 are located on the inner sides of the two elastic pieces 161, respectively.

Figure 10:
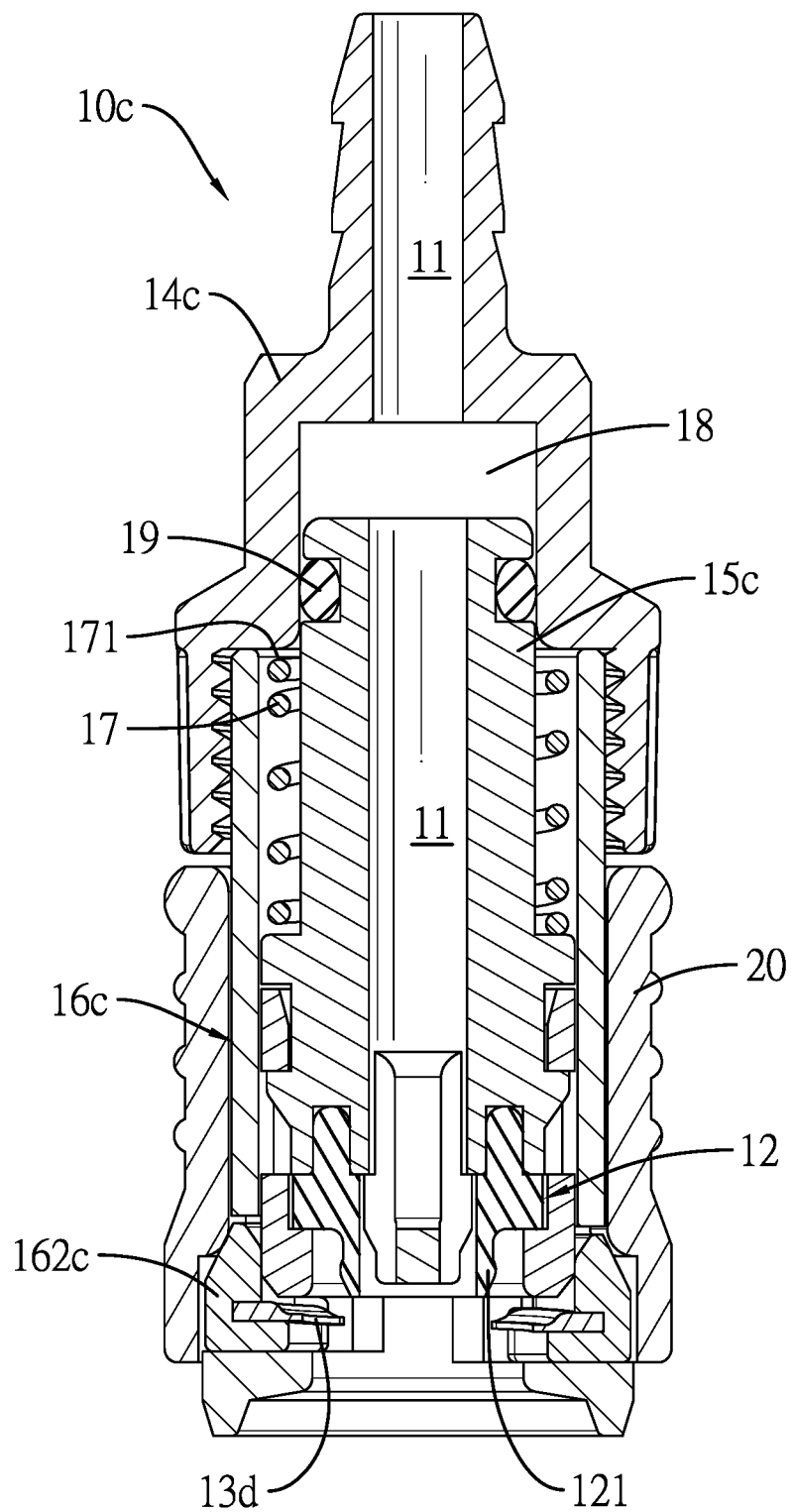
FIG. 10 is a cross-sectional side view of a fifth embodiment of an inflation adapter in accordance with the present invention.
Figure 11:
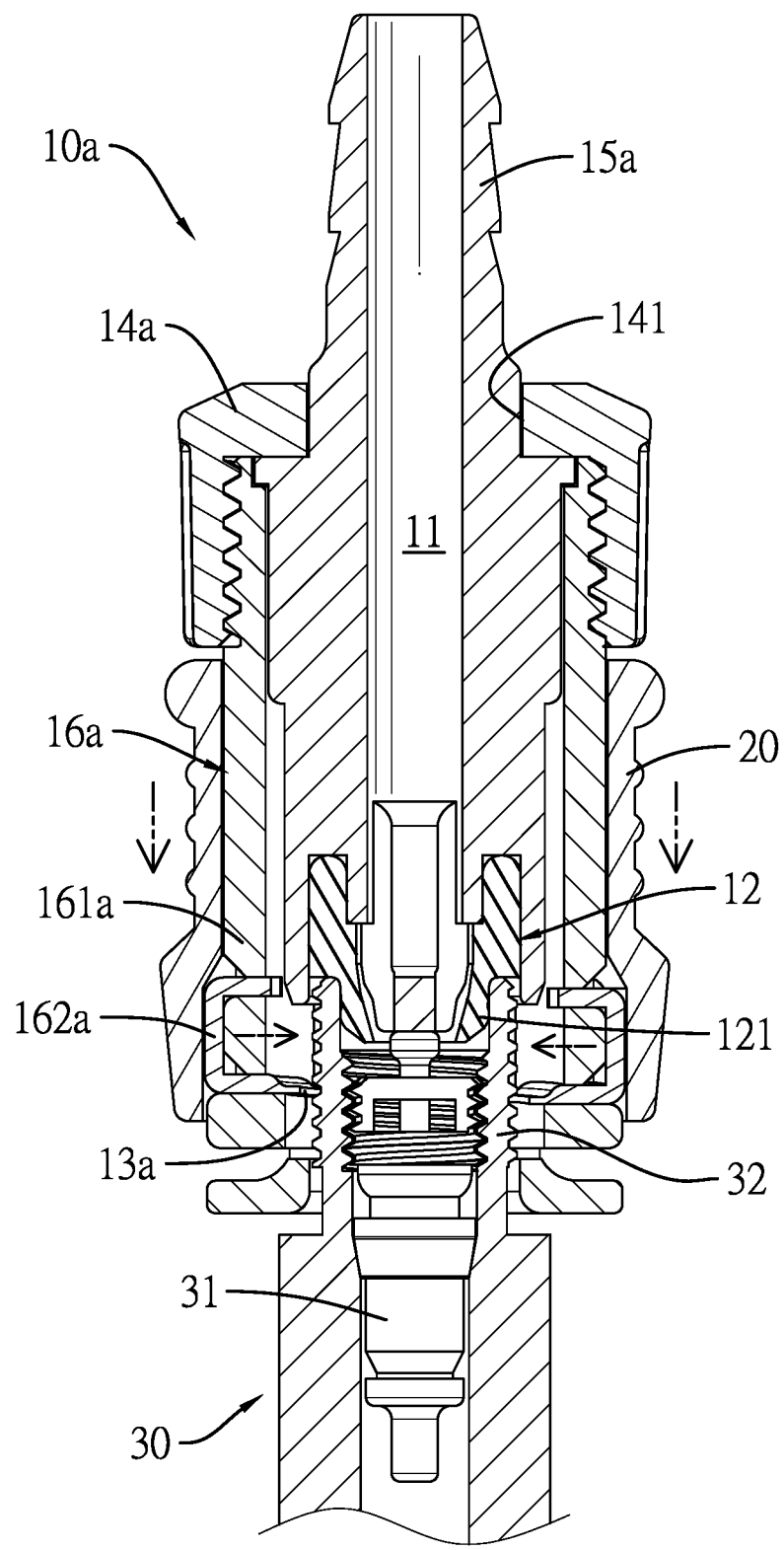
FIG. 11 is an operational cross-sectional side view of the inflation adapter in FIG. 1, showing the inflation adapter assembled to a tire valve.
Figure 12:
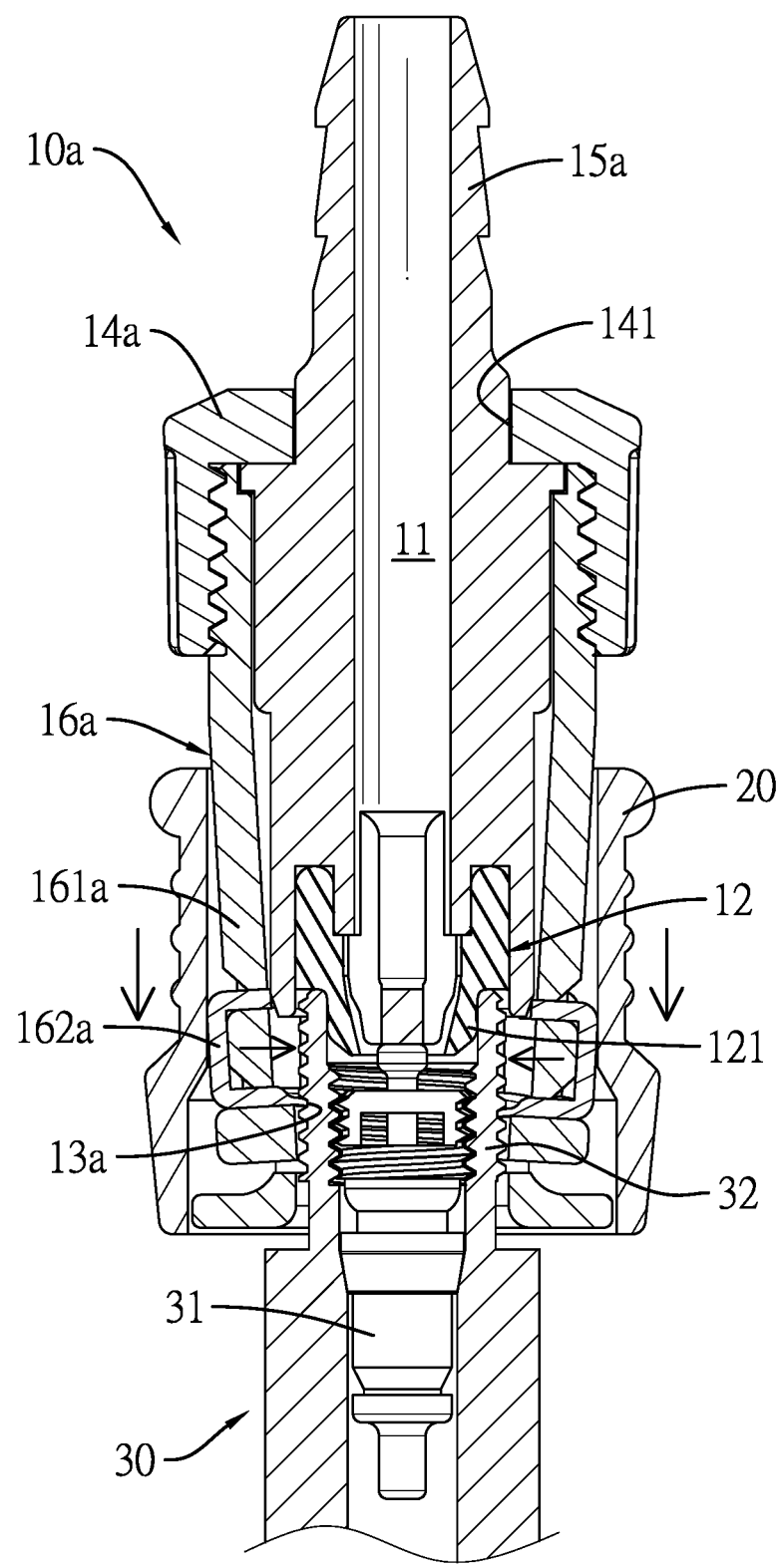
FIG. 12 is another operational cross-sectional side view of the inflation adapter in FIG. 1, showing a sleeve pushing against multiple holding members.

With reference to FIGS. 8 to 10, in the fourth preferred embodiment to the fifth preferred embodiment of the inflation adapter, the holding member 16b has at least one combination block 163. Specifically, the at least one combination block 163 may include two combination blocks 163. The two locking parts 13b, 13c are formed on the inner sides of the two combination blocks 163. With reference to FIGS. 8 and 9, the two locking parts 13b are integrally formed with the two combination blocks 163. With reference to FIG. 10, the two locking parts 13c are assembled with the two combination blocks 163 and disposed on the inner sides of the combination blocks 163, respectively.

When the inflation adapter is in use, with reference to FIGS. 11 to 18, a user combines the nozzle body 10a, 10b, 10c of the inflation adapter with the inflator unit. The user directly holds and pushes the sleeve 20 downward. When the nozzle body 10a, 10b, 10c of the inflation adapter is assembled on the tire valve 30, the sleeve 20 abuts against the two locking parts 13a to buckle and fix the tire valve 30. Thereby, the user can quickly assemble or disassemble the inflation adapter. When the nozzle body 10a, 10b, 10c, of the inflation adapter is assembled on the tire valve 30, the connecting component 15a, 15b, 15c of the nozzle body 10a, 10b, 10c abuts against an air-core 31 of the tire valve 30. The ventilation channel 11 is allowed to communicate with the inner space of the tire valve 30, and a valve stem 32 of the tire valve 30 airtightly abuts against the sealing washer 12. Therefore, when the user adjusts the air pressure inside the tire to the standard air pressure, the user can quickly disassemble the inflation adapter, thereby effectively preventing the gas inside the tire from leaking out and keeping the air pressure inside the tire at the standard air pressure, which in turn improves driving safety.

Figure 13:
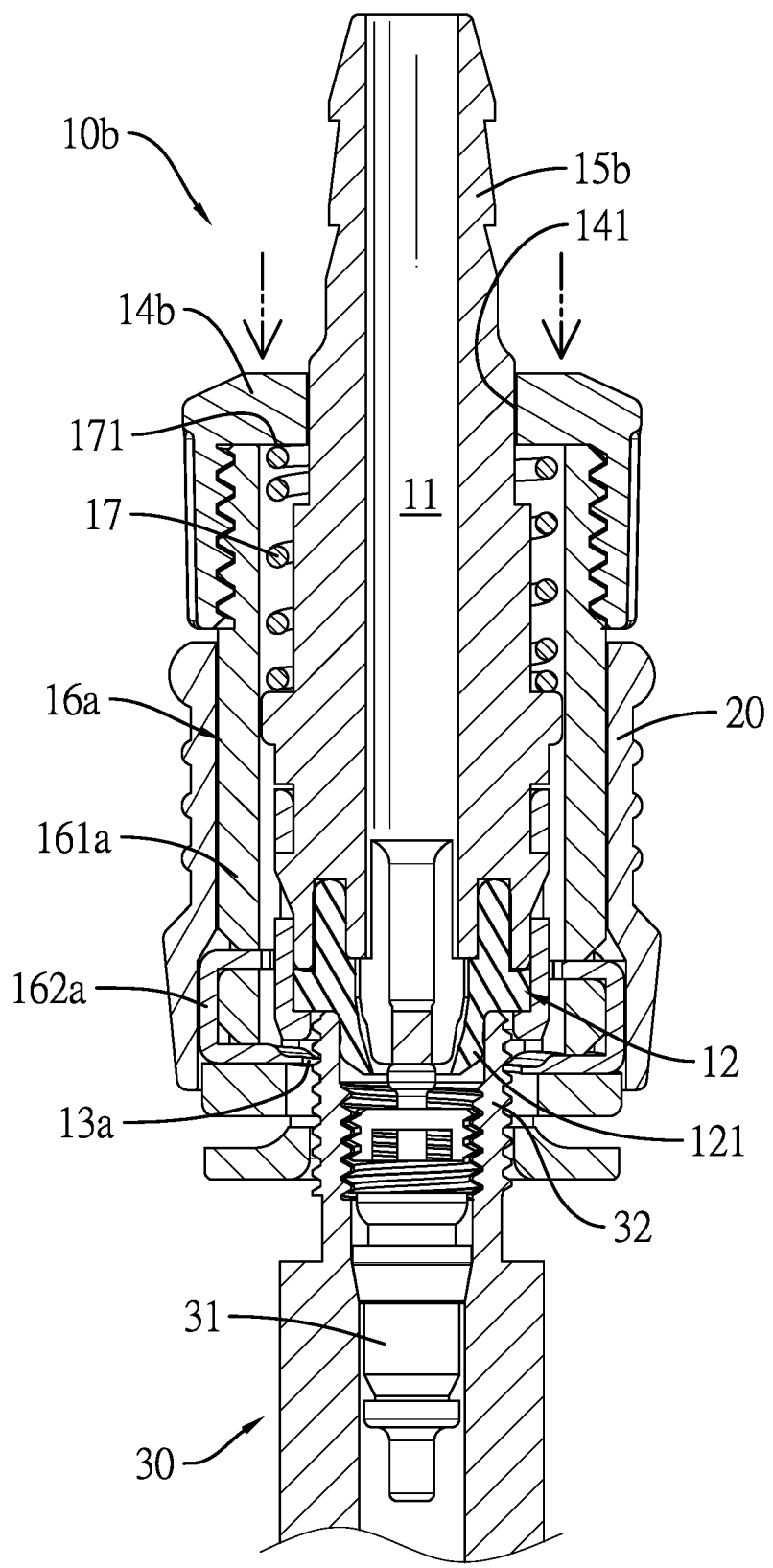
FIG. 13 is an operational cross-sectional side view of the inflation adapter in FIG. 5, showing the inflation adapter assembled to a tire valve.
Figure 14:
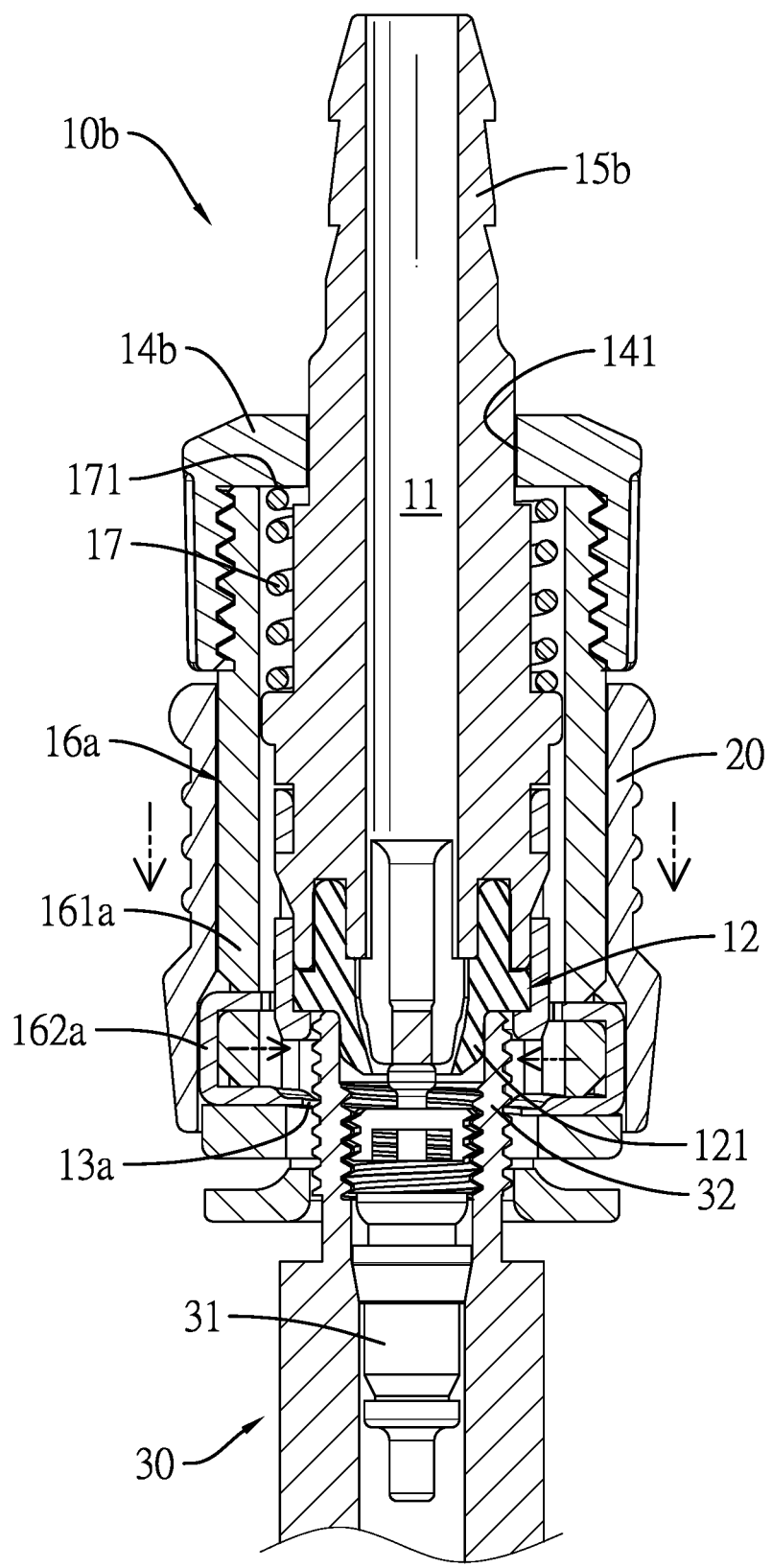
FIG. 14 is another operational cross-sectional side view of the inflation adapter in FIG. 5, showing a sleeve pushing against multiple holding members.
Figure 15:
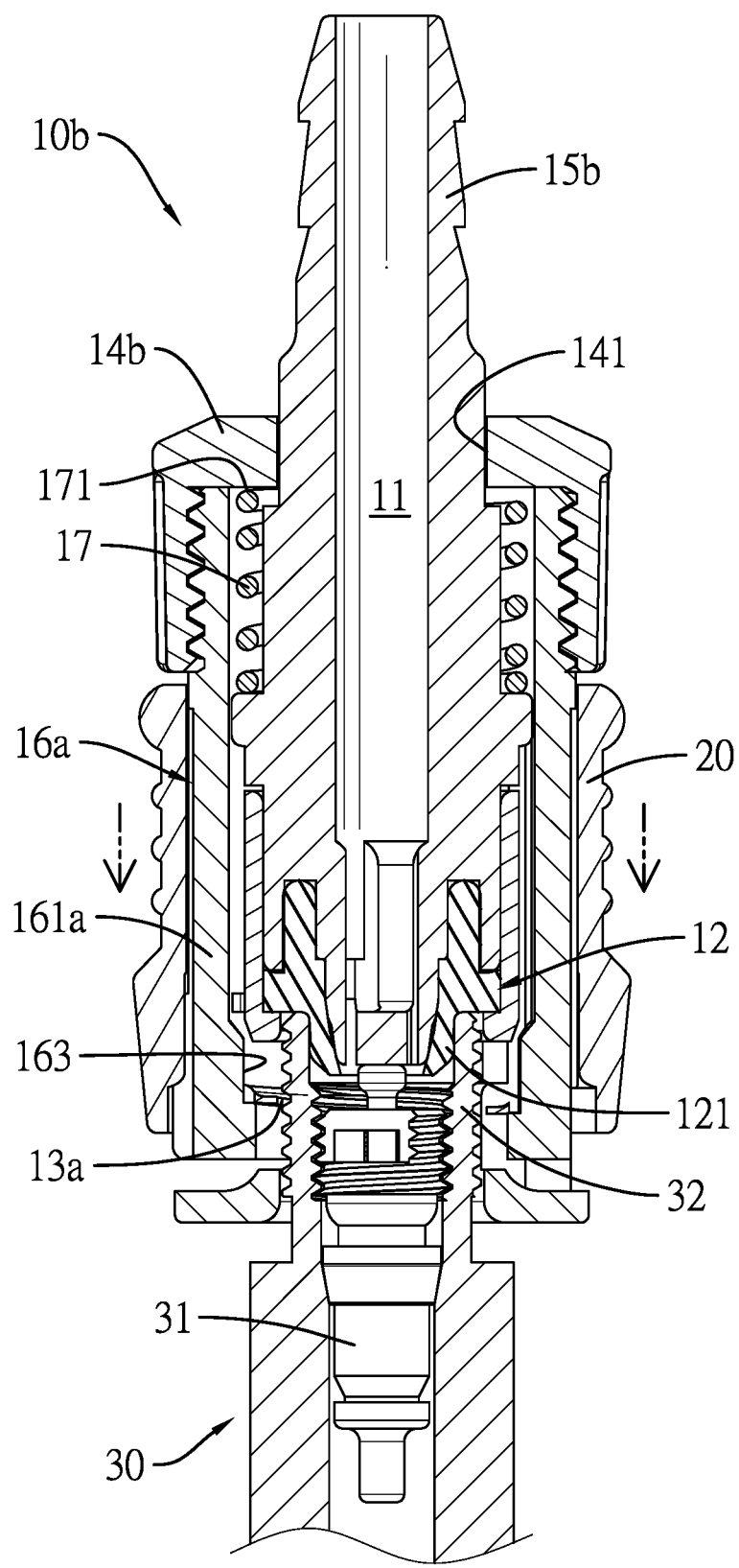
FIG. 15 is still another operational cross-sectional side view of the inflation adapter in FIG. 5, showing the sleeve pushing against the multiple holding members.

With reference to FIGS. 13 to 15, in the second preferred embodiment of the inflation adapter, before using the inflation adapter, the two pushing protrusions 162 of the two elastic pieces 161 abut the connecting component 15b of the nozzle body 10b. When the inflation adapter is assembled on the tire valve 30, the connecting component 15b moves relative to the hole 14b of the nozzle body 10b by abutting against the valve stem 32 of the tire valve 30. The connecting component 15b is pushed away from the two pushing protrusions 162 on the inner sides of the two elastic pieces 161. The sleeve 20 pushes downward and abuts against the two elastic pieces 161 for the two locking parts 13a to engage with the thread of the valve stem 32.

With the arrangement of the two pushing protrusions 162, it can be ensured that when the inflation adapter is sleeved on the tire valve 30, the inflation adapter can assemble the two locking parts 13a to the thread of the valve stem 32 after extending into the tire valve 30 for a certain depth. Besides, the restoring spring 17 could provide a pushing force to improve the airtightness between the inflation adapter and the tire valve 30. Moreover, when the inflation adapter is disassembled from the tire valve 30, the restoring spring 17 resets the connecting component 15b. The connecting component 15b will push against the two pushing protrusions 162 after resetting to make the two elastic pieces 161 reset, thereby preventing the two elastic pieces 161 from affecting the assembling smoothness of the inflation adapter to the tire valve 30 due to elastic fatigue.

With reference to FIGS. 11 to 15, from the first preferred embodiment to the third preferred embodiment of the inflation adapter, when the user pushes the sleeve 20 downward, an inner surface of the sleeve 20 abuts against the two elastic pieces 161 of the holding member 16a to make the two locking parts 13a engage with the thread of the tire valve 30 for assembly.

Figure 16:
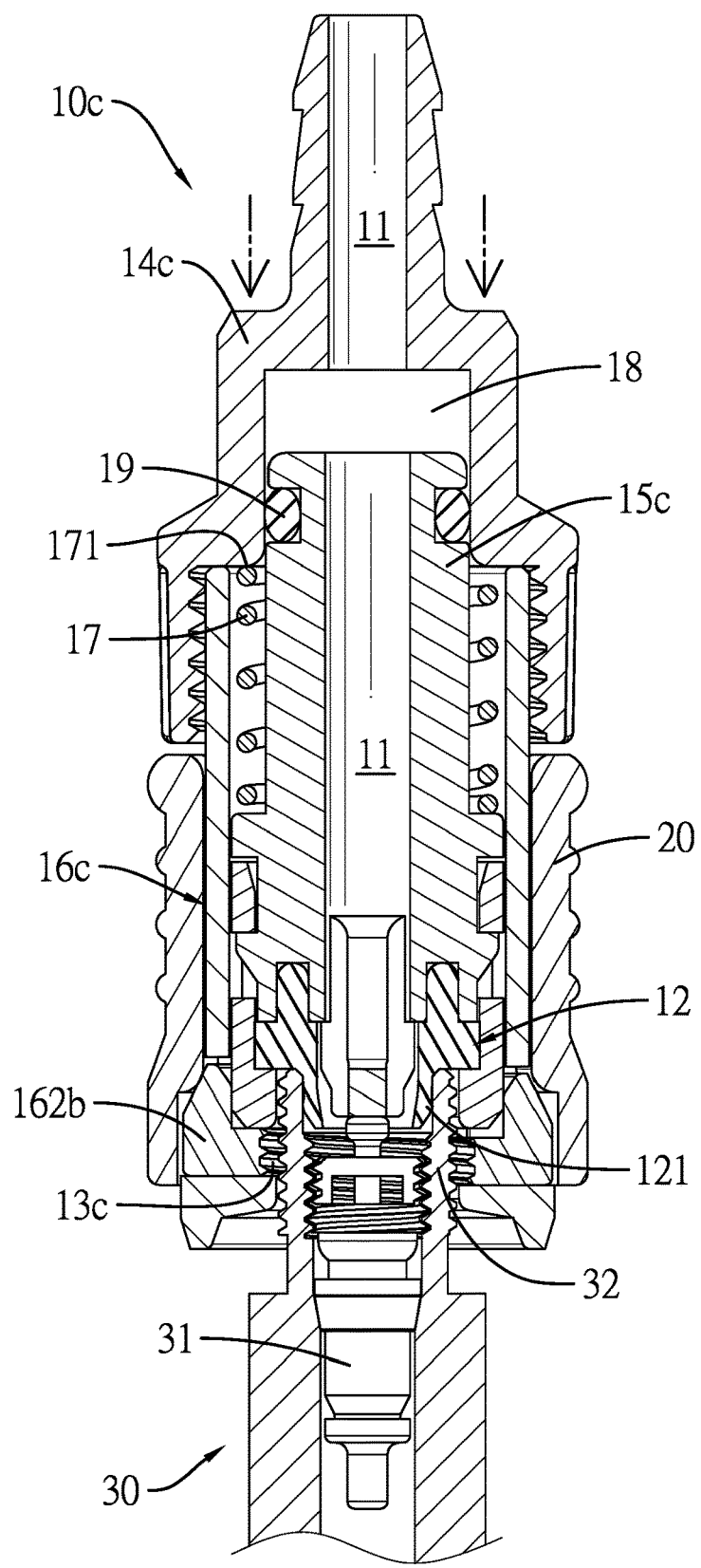
FIG. 16 is an operational cross-sectional side view of the inflation adapter in FIG. 8, showing a sleeve pushing against multiple holding members.
Figure 17:
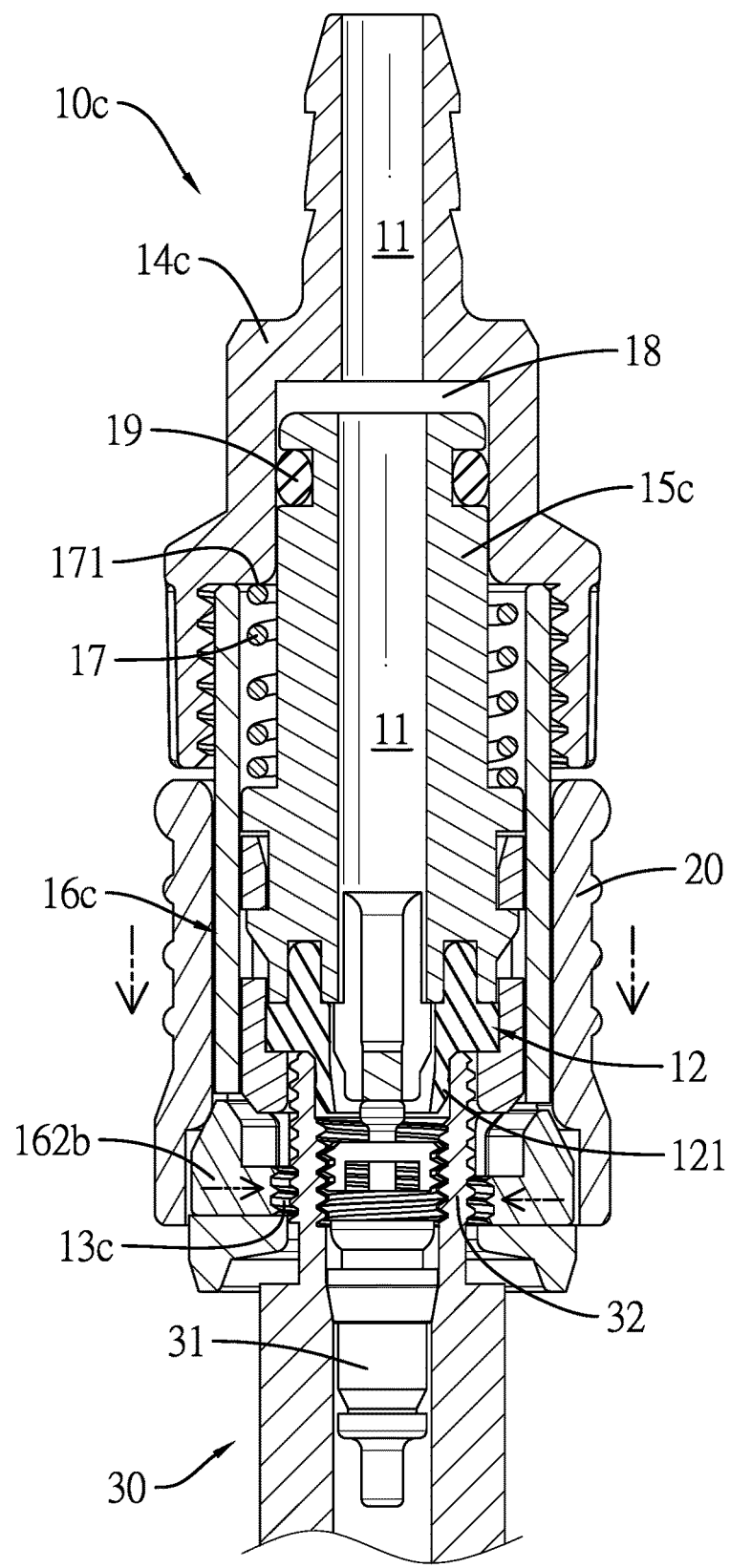
FIG. 17 is another operational cross-sectional side view of the inflation adapter in FIG. 8, showing the sleeve pushing against the multiple holding members.
Figure 18:
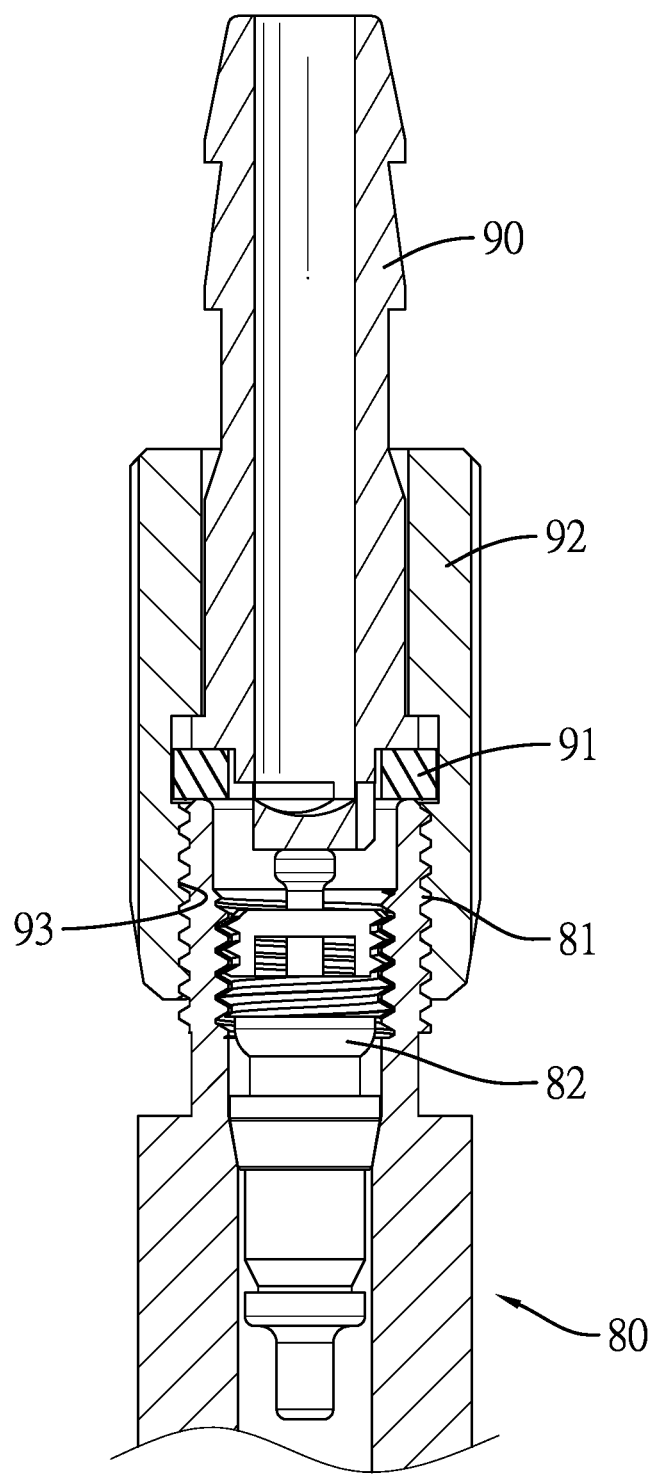
FIG. 18 is an operational cross-sectional side view of an inflation adapter in accordance with the prior art, showing the inflation adapter assembled to a tire valve.

With reference to FIGS. 16 and 17, in the fourth preferred embodiment of the inflation adapter, when the user pushes the sleeve 20 downward, an inner surface of the sleeve 20 abuts against the two combination blocks 163 of the holding member 16b to make the two locking parts 13b engage with the thread of the tire valve 30 for assembly.

Besides, with reference to FIGS. 10 to 15, when the inflation adapter is assembled on the tire valve 30, the valve stem 32 of the tire valve 30 will abut the sealing washer 12, and the flange 121 at the bottom end of the sealing washer 12 protrudes into the valve stem 32. During the inflation process, the air pressure in the valve stem 32 of the tire valve 30 causes the flange 121 of the sealing washer 12 to abut against the inner surface of the valve stem 32, thereby further improving the airtightness.

Accordingly, in the inflation adapter of the present invention, the sleeve 20 matches with the two locking parts 13a, 13b, 13c of the nozzle body 10a, 10b, 10c. The user directly assembles the inflation adapter to the tire valve 30 by pushing the sleeves 20. Thereby, the operation convenience can be effectively improved and the operation time efficiently saved. The problem of gas leakage inside the tire during removal of the inflation adapter can be avoided so that the air pressure inside the tire is maintaining at the standard air pressure to improve driving safety.

What is claimed is:

1. An inflation adapter for connecting with an inflator unit and being assembled to a tire valve, the inflation adapter comprising:
    a nozzle body having
        a ventilation channel formed axially through the nozzle body;
        a sealing washer mounted in a bottom end of the ventilation channel;
        at least one locking part being radially movable on the nozzle body; and
    a sleeve sleeved on the nozzle body, being axially slidable on the nozzle body, and selectively pushing against the at least one locking part to securely hold the tire valve;
    wherein the nozzle body has
        a mounting base having a hole;
        a connecting component mounted through the hole of the mounting base, being axially slidable relative to the mounting base, and the ventilation channel axially extending through the connecting component, such that the sealing washer is mounted to a bottom end of the connecting component;
        a restoring spring mounted between the connecting component and the mounting base and having two opposite ends abutting the connecting component and the mounting base respectively; and
        a holding member mounted to the mounting base;
    wherein the at least one locking part is located on the holding member and below the connecting component;
    wherein the sleeve is sleeved on the holding member and is axially slidable on the holding member;
    wherein the holding member has at least one elastic piece connected with the mounting base, wherein each of the at least one locking part is disposed on an inner side of a respective one of the at least one elastic piece; and
    at least one pushing protrusion located on the inner side of the at least one elastic piece.

2. The inflation adapter as claimed in claim 1, wherein the sealing washer has a flange protruding downward from a bottom end of the sealing washer.

* * * * *